R. MALCOM.
PROCESS OF COLORING FLEXIBLE TRANSPARENT MATERIALS.
APPLICATION FILED JULY 19, 1916.
1,332,349. Patented Mar. 2, 1920.
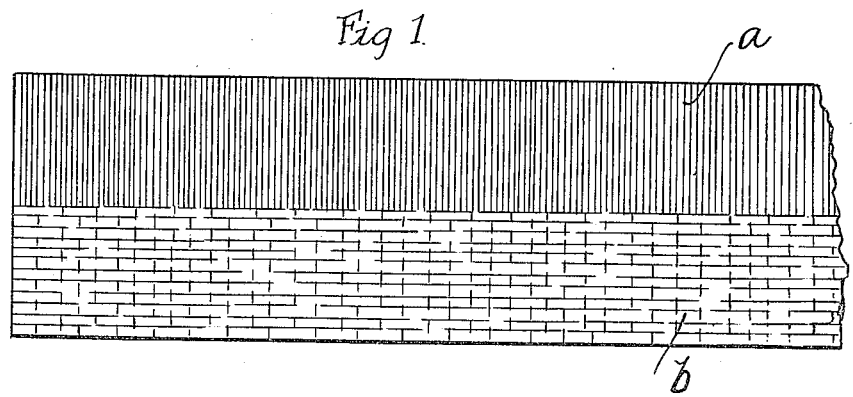
Fig 1.
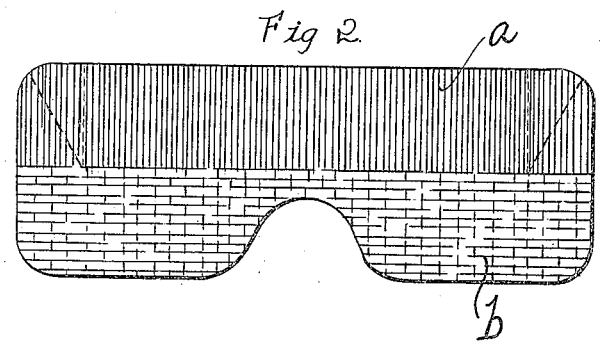
Fig 2.
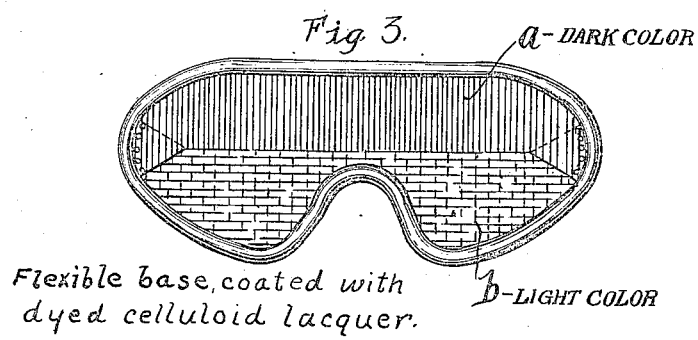
Fig 3. *a* – DARK COLOR
Flexible base, coated with dyed celluloid lacquer. *b* – LIGHT COLOR
WITNESS
Willis King
INVENTOR
By Robert Malcom
ATTY

UNITED STATES PATENT OFFICE.

ROBERT MALCOM, OF CHICAGO, ILLINOIS.

PROCESS OF COLORING FLEXIBLE TRANSPARENT MATERIALS.

1,332,349.      Specification of Letters Patent.      Patented Mar. 2, 1920.

Application filed July 19, 1916. Serial No. 110,029.

*To all whom it may concern:*

Be it known that I, ROBERT MALCOM, a citizen of the United States, residing at Chicago, Cook county, State of Illinois, have invented certain new and useful Processes for Coloring Flexible Transparent Materials, of which the following, taken in connection with the drawings, is a description.

My invention has for its object the production of a process for coloring flexible, transparent material, such as celluloid or pyrolin, which is now very extensively used in the manufacture of eye shields and protectors, and in analogous arts, to which class my invention shown, described and claimed in my pending application for patent, Serial No. 34,972, belongs.

In this class of inventions, as shown in my pending application above referred to, as well as in my Patent No. 1,183,398, it is desirable to construct eye shields and protectors of this kind of material of contrasting colors, having one portion clear, through which the vision is unimpaired, and the other portion relatively darker to shade the eyes from the direct rays of the light or reflection from the sun or water, etc.

The form of construction in this class of shields, is shown in my patent above referred to, which requires additional material to manufacture, as well as additional time and labor in assembling the parts, whereas the form of construction shown in my pending application above referred to, greatly simplifies the construction as well as reduces the cost of production.

The object of my present invention is to provide a method or process of producing contrasting colors on sheets or strips of flexible, transparent material so that the blanks or patterns forming the article to be manufactured, may be formed of a single piece of material, but having a shaded portion formed therein of relatively darker material than the color of the body of the material.

In the accompanying drawings, I have illustrated the application of my invention to the material described, and have shown how said material is adapted to be used for the purpose specified, although, of course, I do not desire to be limited to the specific use of said material as here shown. In these drawings, Figure 1 is a plan view of a strip or sheet of flexible, transparent material, such as celluloid or pyrolin, one half of which is of one color, and the other of a contrasting color;

Fig. 2 is a plan view of a pattern of an eye shield adapted to be formed of strips of material of this kind; and Fig. 3 is a front elevation of a completed shield formed of a single piece of two-colored material.

In carrying out my invention, I employ an operation wherein certain specific ingredients, or their equivalents, are used, as hereinafter more fully described, for coloring this class of material.

In preparing this solution in which the material is to be colored, I employ the desired quantity of what is known as a celluloid solution, to which I add sufficient anilin dye to color the solution to the shade desired. To thin the solution to the proper liquid consistency, I add a volatile liquid, such as alcohol or ether. The solution is then placed in a vat suitable for the purpose and large enough to contain the size of sheet which is to be colored. Into this liquid the edge of the sheet is immersed to the depth it is desired to color the material. The sheet is then removed from the solution and exposed to the air to dry the volatile liquid contained therein, causing the surplus solution to evaporate very quickly, after which the sheet is ready for use as desired.

I have also found it very desirable to spray the coloring solution upon the sheet, instead of dipping the same in the liquid as heretofore explained.

In this process, the solution is prepared as previously described, and placed in a spraying machine. That portion of the sheet or strip which is not to be colored is covered, and the solution sprayed on the exposed portion thereof, after which it is exposed to the air to dry, as heretofore explained.

By this method a great variety of shades of color may be employed in forming different combinations of colors for eye shields or protectors of the class previously referred to, the method or process of applying the coloring solution being the same in either instance.

It will be seen that I provide a strip of material out of which the two-colored shields may be formed, without using two thicknesses of material, or without cementing, or otherwise securing two pieces of material together.

By using strips of flexible, transparent material having different colors extending longitudinally thereof, as shown at $a$ and $b$ in Fig. 1 of the drawing, the pattern for the shield may be cut therefrom, as shown in Fig. 2, with the relatively darker or shaded portion of the material $a$ at the top thereof, and by bending or folding the corners as shown in Fig. 3, to permit the shield proper to extend away from the features of the face, the shield is formed of one piece, without seams or double thicknesses in the body of the shield, between which dust, etc., may collect.

I claim:

1. The herein described process of coloring non-absorbent transparent materials consisting in coating a celluloid base with a celluloid lacquer containing an anilin dye of a contrasting color to a portion of the sheet or strip of material to be colored.

2. The herein described process of coloring non-absorbent transparent materials consisting in coating a celluloid base with a celluloid solution containing an anilin dye of a contrasting color, and a volatile liquid, to that portion of the sheet or strip to be colored.

In testimony whereof I have signed this specification.

ROBERT MALCOM.